A. SPRATER.
STABILIZING DEVICE FOR FLYING MACHINES.
APPLICATION FILED AUG. 26, 1912.
1,087,993.
Patented Feb. 24, 1914.
2 SHEETS—SHEET 1.
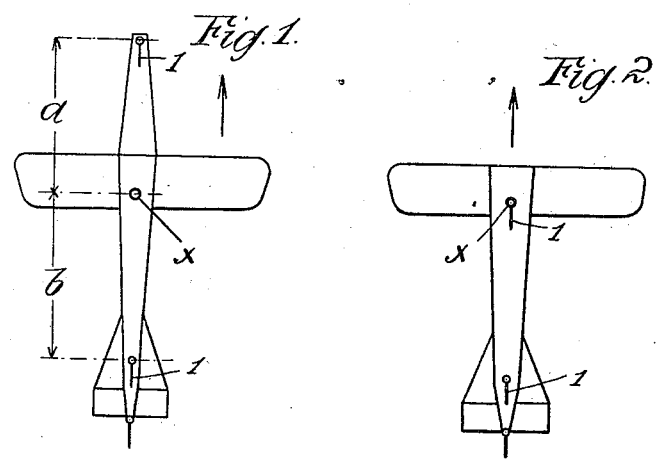
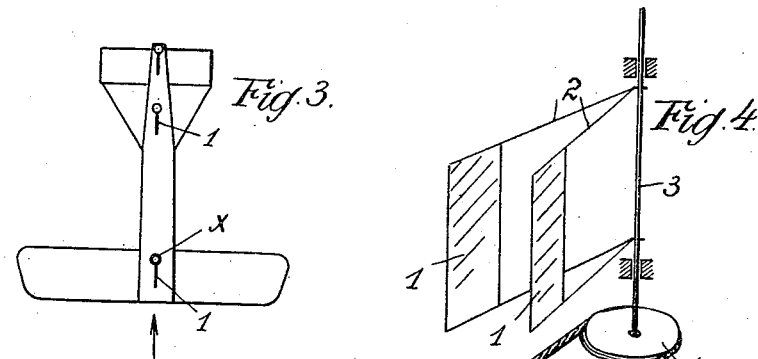
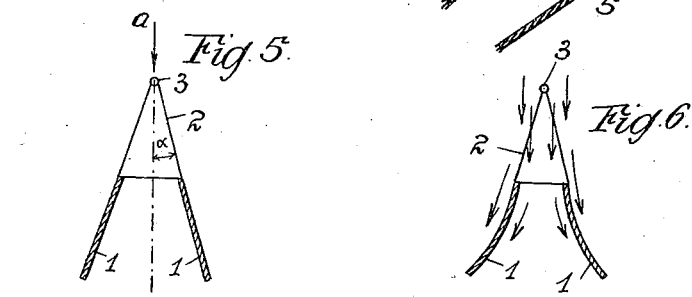
Witnesses.
Inventor.
Adolf Sprater
by

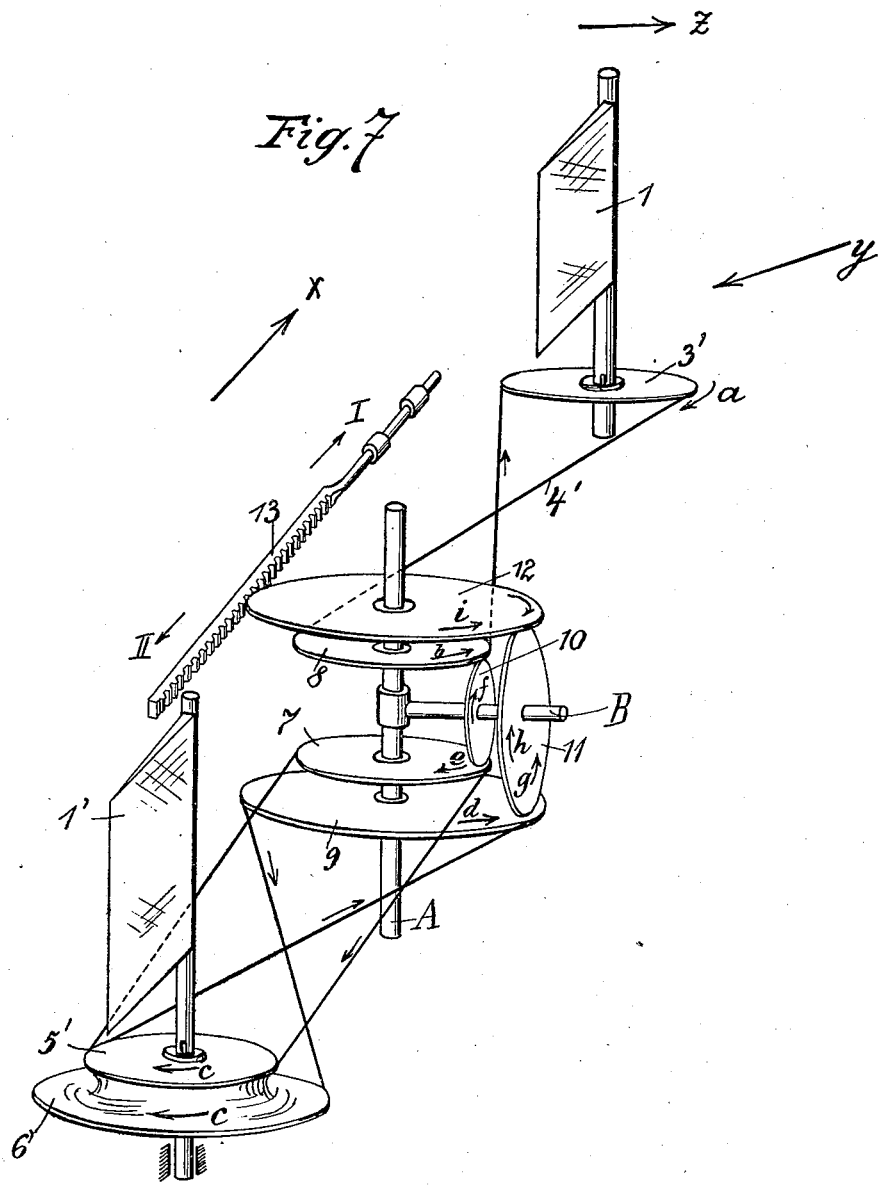

UNITED STATES PATENT OFFICE.

ADOLF SPRATER, OF NEUSTADT, GERMANY.

STABILIZING DEVICE FOR FLYING-MACHINES.

1,087,993.  Specification of Letters Patent.  Patented Feb. 24, 1914.

Application filed August 26, 1912. Serial No. 717,106.

*To all whom it may concern:*

Be it known that I, ADOLF SPRATER, engineer, a citizen of the German Empire, and resident of Neustadt, Haardt, Germany, with the post-office address Karolinenstrasse No. 65, have invented new and useful Improvements in Stabilizing Devices for Flying-Machines, of which the following is a specification.

The subject of the invention is a stabilizing device for flying machines.

The automatic maintenance of equilibrium in flying machines is a problem the solution of which, though many times attempted, has not yet been completely solved. The chief reason for the lack of success is that the various causes tending to affect the stability of the machine have not all been taken into consideration. The result has been therefore, that while one and the same stabilizing device may render these disturbances innocuous at one time, it intensifies their adverse effect at another. This applies more particularly to lateral stabilization. If this be destroyed, the direction of the relative counter-wind passes out of the plane of symmetry of the machine, on account, *inter alia*, of the following causes:

1. A lateral gust of wind occurs which, by reason of inertia, the flying machine is unable to respond to at once. Consequently, the angle of incidence of the gust is determined from the parallelogram resulting from the velocity of the machine and that of the gust.

2. For some reason or other the flying machine is in a slanting position in which the one end of the supporting surface is on a lower level than the other. In consequence of the slant of the total resistance, a lateral component is set up which adds a lateral slipping motion to the forward movement of the apparatus.

3. The flying machine, the wheels of which are not adapted for steering, starts to run along a narrow track which is not in the same direction as the wind that is blowing at the time. The angle of incidence is determined by the parallelogram of the velocity of the wind and the accelerated starting velocity and therefore alters continuously in rapid succession.

4. When the supporting surface is distorted in an asymmetrical manner, for instance by warping the planes or by means of ailerons, a braking force is set up at one end of said surface, unless its moment is counteracted by the suitable adjustment of a lateral rudder or some other organ. The flying machine is consequently obliged to turn, during which movement the angle of incidence of the relative counter-wind at the parts remote from the axis of rotation—for example at the tail end or head end of the machine—undergoes modification. Hence the forward movement of the flying machine is accompanied by a turning movement and when the apparatus actually turns, its mass inertia will cause it to retain its previous direction of flight even in its new position.

All these considerations are borne in mind in the new method. The chief disturbing cause to be kept in view is that mentioned under 1. When, as is usually the case, the flying machine is provided with a vertical rearward keel surface and a similar rudder surface, the resistance offered to the impact of a lateral wind tends to cause the apparatus to turn, which tendency is counteracted by the keel and also, for the most part, by the steering planes, when the turning movement extends beyond the direction of the relative counter-wind prevailing at the moment, which movement, moreover, is in general partially reversed when the action of the gust of wind has ceased. This is particularly the case when the whole operation proceeds so quickly that no appreciable change takes place in the direction of movement of the center of gravity of the flying machine. When, however, the operation is more protracted, this change may become very considerable, because the direction of the force of the propeller changes as the apparatus turns, and that force continues to act in the new direction. If there is no keel surface, but only a vertical steering surface present, this latter, in its position of repose, has the same effect as a keel, especially when, as is often the case, counterbalanced or locked with relation to its operating device. If, during the occurrence of the gust, the rudder is held in a definite steering position, the flying machine may be forced around some distance beyond the direction of the relative counter-wind, without any return movement being effected. It is for this reason that lateral gusts of wind may produce very troublesome disturbances in flying.

The cause of disturbance specified under 2, has usually still more inconvenient consequences, unless the disturbance be rectified in time: a fall being inevitable in such cases.

Disturbance of stability produced by cause 3 is a source of hindrance to the learner in starting, and also to the experienced pilot, especially when the lateral wind is gusty.

The first point about the new method is that, apart from the lateral steerers, the flying machine has no large vertical surfaces—keel surfaces especially—situated at a remote distance from the center of gravity, except that a similar surface is arranged on the opposite side of the flying machine in such a manner that, given a slanting impact of the air, the moment of rotation of the resistance, offered by the first named surface is exactly counteracted by the moment of rotation of the other surface.

According to the invention the lateral steerer is subjected to the influence of two vertical surfaces, flying loosely in the wind and adjusting the steerer exactly in the direction of the slanting counter-wind resulting from causes 1, 2 and 3, so that the lateral steerer cannot in any case offer any lateral resistance and thereby cause the flying machine to turn. The two wind vanes or adjusting surfaces, which may also be termed indicators of direction, adapt themselves very quickly to the direction of the relative counter-wind. The one adjusting surface is situated as far in front or behind the center of gravity as possible, while the other is placed near the center of gravity or at a convenient distance from same on the other side of the machine. The object of this disposition is to utilize the two wind vanes and their accessories also for indicating and correcting such turning movements of the flying machine as may occur when the stability is disturbed by cause 4. When this kind of turning movement occurs, the two wind vanes assume different positions, since the direction of the relative counter-wind at the wind vane which is remote from the axis of rotation is determined by the parallelogram of the forward and turning movements. If, however, this wind vane is mounted just as far in front of the center of gravity of the flying machine as the other vane is to the rear of same, then the two adjusting surfaces deviate equally, but in opposite directions.

Since, when the two direction indicators deviate in parallel, it is the intention that the lateral steerer should be adjusted parallel with them, so that the wind can only strike the front edge without turning the apparatus, whereas when the direction indicators deviate in opposite directions, the steerer is intended to deviate so as to oppose any turning of the apparatus, it is necessary, in order to satisfy these divergent conditions, to interpose a transformer of movement between these two direction indicators, the said transformer operating the lateral steerer either directly or by means of a servo-motor. At the same time the arrangement is such that even when several of the aforesaid causes of disturbed stability operate conjointly, the proper adjustment of the steerer necessary to remove or rectify the operating cause is effected in each case.

Provision is also made for operating the stabilizing device by hand, even while the automatic appliance is in gear, and without the latter being a hindrance. Moreover, provision is made for insuring that the hand operating mechanism remains in gear even should the servo-motor or automatic stabilizing device fail.

In the drawing, several forms of carrying out the invention are illustrated diagrammatically.

Figure 1 is a sketch of a flying machine in which the one vane is mounted in front, and the other in rear, of the center of gravity. In the diagram, Fig. 2, the one wind vane is situated at the center of gravity, and the other at the tail end of the flying machine. In the modification according to Fig. 3, the one wind vane is in front of the apparatus, while the other is arranged at the center of gravity. Figs. 4 and 5 are a perspective and plan view respectively of a modification with one wind vane. Fig. 6 represents a plan of a modified form. Fig. 7 is the diagram of the transformer of movement.

Since the wind vanes are highly sensitive and must adjust themselves in the direction of the wind with considerable force without producing any large resistance impairing the accuracy of the adjustment, it is preferable to employ direction indicators of the patterns shown in Figs. 4 to 5.

In the modification according to Figs. 4 and 5, two vertical, plane surfaces 1 are employed, which may be rigid or flexible, and are arranged on an open frame 2 adapted to rotate about the axis 3. The two surfaces 1 converge toward the axis 3, which is fitted with a cord pulley 4 the rotation of which is transmitted, by means of a cord, to the transformer described below.

If the direction of impact of the wind corresponds to the arrow $a$, Fig. 5, the angle of incidence is the same for both the surfaces 1. A considerable moment of rotation is set up at each surface, the two moments, however, counterbalancing each other. If the angle of incidence changes and becomes, for example equal to the angle of slope $\alpha$, then the moment of rotation of the right-hand plate 1, of Fig. 5, becomes equal to zero, and only the moment of the resistance of the left-hand surface 1, comes into operation. At the same time, this increases considerably, since the angle $2\alpha$ now comes under consideration.

If the plates 1 be shaped according to Fig. 6, injurious air eddies are prevented, the air being able—as indicated by the arrow—to pass through without restriction and without the formation of eddies. Moreover, the box shape of the adjusting surfaces according to Figs. 4 to 6, has the advantage that the rear side of the plates is utilized as well.

The object of the transformer or differential transmission mechanism shown in Fig. 7 is to transform the rotary movements transmitted to it through the pinions 4 of the direction indicator, into movements of a certain amplitude and direction, so as to adjust the servo-motor or steering surface accordingly. In Fig. 7 the flying machine is moving in approximately the same direction as the arrow $x$, two vanes 1 and 1' being used to operate the lateral steerer. The vane 1' is mounted close to the center of gravity of the flying machine, while the vane 1 is situated at a considerable distance from that center. The vane 1 with its rod is rigidly secured to a wheel 3', over which runs a cord 4', while the vane 1' with its rod is rigidly secured to the wheels 5' and 6', so that when this vane is turned, the same movement is described by both the wheels 5' and 6'. A shaft A carries four wheels 7, 8, 9 and 12, each rotating loosely and separately. The two central wheels, 7 and 8, have rotative contact with the wheel 10, and the two outer wheels, 9 and 12, with a wheel 11. The wheels 10 and 11 rotate loosely and independently on a shaft B, which is adapted to move loosely about the shaft A and is arranged transversely thereto. The disk 12 actuates a rack 13 which actuates the lateral steerer or rudder of the flying machine in any suitable way. The disk 5' is shaped as a grooved pulley and, by means of a straight cord, drives the disk 7, while the similarly shaped disk 6' drives the disk 9 by means of a crossed cord. The disks 7 and 9 are grooved at the periphery for the reception of the cord or rope. The disk 3', which is also shaped as a grooved pulley, drives the disk 8 by means of a crossed cord 4', this latter disk being also provided with a groove. This transformer works in the following manner: If a gust of wind acts on the flying machine in the direction of the arrow $y$, or the flying machine has a corresponding side slip, the vanes 1 and 1' rotate in the direction of this wind, that is to say, the disk 3' rotates in the direction indicated by the arrow $a$, and the disk 8 therefore in the direction $b$. Since the same action is exerted on the vane 1', the disks 5' and 6' rotate in the direction indicated by the arrows $c$ $c$, the disk 5' turning the disk 7 in the direction indicated by the arrow $e$, while the disk 6' turns the disk 9 in the direction indicated by the arrow $d$. By means of the disks 8 and 7, the wheel 10 is caused to rotate in the direction indicated by the arrow $f$, and since the movement of the two vanes is the same, the movement of the disks 7 and 8 is also identical, so that the disk 10 merely rotates, without displacing the shaft B out of its position, that is to say causing it to rotate about the shaft A. The disk 6' on the other hand influences the disk 9 in the opposite way to the disk 7, so that the disk 11 is rotated in the direction of the arrow $g$. This rotation is transmitted by the disk 11 to the disk 12, which, in turn, actuates the rack 13 in the direction of the arrow I, so that, when, for example, the maintenance of lateral stability is in question, the rudder is adjusted in such manner—according to the condition of the lateral resistance of the flying machine under the influence of the disturbance—that the result is to leave no surplus moment of rotation with relation to the vertical axis of rotation, unless it be desired—by an automatic, excessive steering movement—to reverse any slight turning of the apparatus that may have occurred in consequence of a certain sluggishness in the stabilization.

If the flying machine is not influenced by a gust of wind, but deviates, for instance laterally, the vane 1 will thereby be exposed to a side wind during the continuance of said movement, whereas the vane 1' situated near the center of gravity will not change its position appreciably. Assuming that the deviation of the flying machine takes place about an axis in the vicinity of the vane 1' and in the direction of the arrow $z$, the vane 1 will be exposed to a side wind moving in the direction $y$, so that, so far as the vane 1 is concerned, the series of movements will remain as before. Since, however, in consequence of its nearness to the center of gravity, the vane 1' remains unchangeable, its disks 5' and 6', and therefore the disks 7 and 9 remain unaffected. The result will be that, influenced by the disk 8, the disk 10 will rotate over the disk 7 in the direction of the arrow $f$, the disk 7, as already mentioned, remaining stationary. Similarly, the disk 11—since the shaft B is now displaced by the rolling movement of the disk 10—will roll over the disk 9 in the direction of the arrow $h$, and at the same time the disk 12 will rotate in the direction of the arrow $i$, so that the rack 13 is forced in the direction of the arrow II, that is to say in a direction opposed to the previous steering. To this opposite displacement of the rack 13 also corresponds a reversed rotation of the lateral steerer, so as to hinder and counteract the turning of the flying machine.

In the cases of disturbed stability mentioned under 4, which would result in the apparatus turning about a vertical axis passing through the center of gravity, in the event of the two direction indicators 1 being arranged according to Fig. 1, the two vanes would be deviated to a different extent and in opposite directions. In Fig. 1, the center of gravity is indicated by $x$.

With the direction indicators arranged as in Fig. 2 or Fig. 3—in which the indicator 1 is situated near the center of gravity $x$, the deviation of the indicators is no greater than in Fig. 1.

From the foregoing it results that the transformer according to Fig. 7 always transmits the adjustments of the indicator 1 to the lateral steerer in such a manner that the latter renders an incipient disturbance of the stability innocuous, counteracting any tilting motion of the apparatus.

The details of the invention may, of course, be varied at convenience, the sole point being the protection of the fundamental principle.

Now what I claim and desire to secure by Letters Patent is the following:

1. In a flying machine provided with a rudder or the like, a stabilizer consisting of two vertical surfaces adapted to be actuated by the wind, connections whereby said surfaces actuate the rudder, one of said surfaces being located at one end of the machine and the other surface being located near the center of gravity of the machine.

2. In a flying machine provided with steering rudder or the like, a stabilizer consisting of two rudder actuating elements located at different points longitudinally of the machine, and differential transmission mechanism interposed between said elements and said rudder.

3. In a flying machine provided with steering means, a stabilizer consisting of two vertical surfaces adapted to be actuated by the wind and acting upon said steering means, said surfaces being arranged at separate points longitudinally of the machine and at opposite sides of the center of gravity of the machine.

4. In a flying machine provided with steering means, a stabilizer consisting of two vertical surfaces arranged at separate points longitudinally of the machine and adapted to be actuated by the wind, said surfaces acting upon the steering means, each surface consisting of two rearwardly diverging vertical plates adapted to rotate about the same shaft.

5. In a flying machine provided with steering means, a stabilizer consisting of two vertical surfaces arranged at separate points longitudinally of the machine and adapted to be actuated by the wind, said surfaces acting upon the steering means, each surface consisting of two rearwardly diverging vertical curved plates adapted to rotate about the same shaft.

6. In a stabilizing device for flying machines provided with steering means, two vertical surfaces adapted to be actuated by the wind and acting upon the steering means, and differential transmission mechanism arranged between said vertical surfaces, said differential transmission mechanism comprising loosely revolving wheels and planet wheels in rotative contact therewith, the axial movements of rotation of said vertical surfaces being transmitted to said loosely revolving wheels, for the purpose specified.

In testimony that I claim the foregoing as my invention, I have signed my name in presence of two witnesses.

ADOLF SPRATER.

Witnesses:
S. H. SHANK,
JOSEPH PFEIFFER.

---

Copies of this patent may be obtained for five cents each, by addressing the "Commissioner of Patents, Washington, D. C."